Aug. 13, 1940.  A. N. GOLDSMITH  2,211,416
PRODUCTION OF SOUND PICTURE RECORDS
Original Filed Feb. 19, 1935

INVENTOR
ALFRED N. GOLDSMITH
BY
ATTORNEY

Patented Aug. 13, 1940

2,211,416

UNITED STATES PATENT OFFICE 2,211,416

PRODUCTION OF SOUND PICTURE RECORDS

Alfred N. Goldsmith, New York, N. Y., assignor to Radio Corporation of America, a corporation of Delaware Original application February 19, 1935, Serial No. 7,165. Divided and this application December 15, 1937, Serial No. 179,944

1 Claim. (Cl. 88—16.2)

This invention relates to the production of sound picture records, and more particularly to improved apparatus for simultaneously recording action and accompanying sound, the present application being a division of my copending application Serial No. 7,165, filed February 19, 1935.

The primary object of my present invention is to provide an improved sound-picture recording apparatus wherein the film paths of a motion picture camera and a sound recorder are interconnected through a flexible or an adjustable conduit to provide an improved apparatus and method of operation whereby the relation between the printed picture and sound records may be readily adjusted during the subsequent printing operation.

Another object of my present invention is to provide an improved sound-picture recording system which is more economical of film than that heretofore used in that it avoids the necessity of recording the sound on a film separate from that on which the picture is recorded.

Still another object of my present invention is to provide an improved sound and motion picture system which enables a variety of angle shots to be made, each with its own accompanying and appropriate sound track.

A further object of my present invention is to provide improved sound-picture recording apparatus which will record the sound tracks in a manner such that they may be utilized later to secure the maximum semblance of stereosonic reproduction.

It is also an object of my present invention to provide improved sound and picture recording apparatus as aforesaid which is simple in construction, economical in cost, and highly efficient in use.

Figure 2:
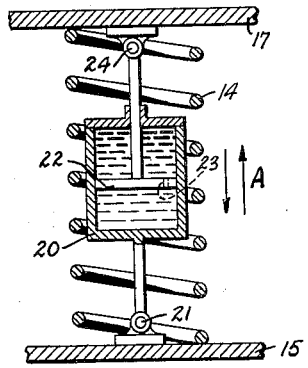
Figure 3:
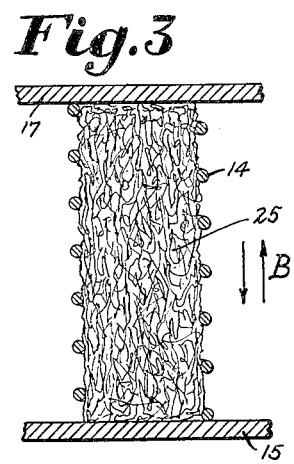

The novel features that I consider characteristic of my invention are set forth with particularity in the appended claim. The invention itself, however, both as to its organization and method of operation, together with additional objects and advantages thereof, will best be understood from the following description of one embodiment thereof, when read in connection with the accompanying drawing, in which Figure 1 is a side elevation of one modification of my invention wherein the motion picture camera and the sound recorder are interconnected through a conduit suitable for passing the film from one to the other, and Figures 2 and 3 are fragmentary sectional views showing certain details of the apparatus embodying my invention.

Figure 1:
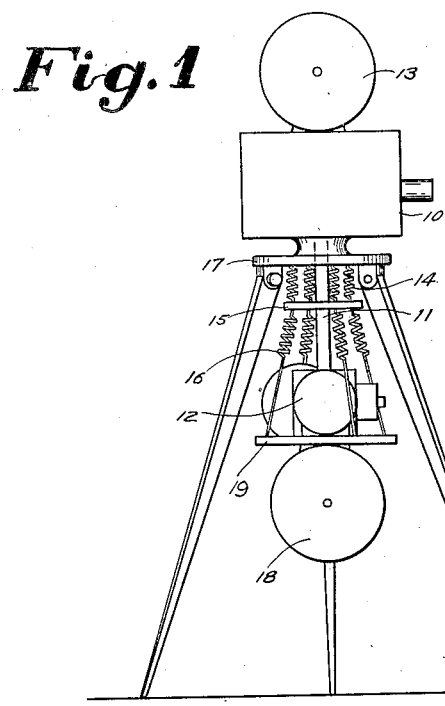

Referring more particularly to the drawing, wherein similar reference numerals indicate corresponding parts throughout, I have shown, in Fig. 1, a typical studio set-up embodying the methods of my invention for photographing a picture and simultaneously recording the accompanying sound. In the illustrated form of my invention, there is shown a camera 10 mounted on a tripod top 17 and having a feed magazine 13 which contains a suitable film arranged to pass through the camera 10 in well known manner. The camera 10 is understood to be an ordinary studio camera with intermittent action, but any form of camera, including a continuous camera, may be used. After leaving the camera 10, the film passes through an opaque or light-tight guide tube 11 to a recorder 12 which is mounted on a suitable support 19, after which the film passes to a take-up magazine 18. The recorder 12 may be a standard studio recorder of the variable density or the variable width recording type, or, indeed of any other type which may be desired. The usual pick-up microphone, or microphones, amplifiers, and monitoring equipment associated with the recorder 12 are not shown but are understood to be substantially identical with those now used or which may prove convenient.

The guide tube 11 may be circular, oval, or rectangular in cross-section, or it may have a cross-section which is rectangular with rounded corners. There is, however, no special restriction on the cross-sectional shape of this tube, except that it shall permit free passage of film therethrough. If desired, small free-running polished rollers may be mounted within the tube 11 so that the film passes between and is guided by such rollers. Alternatively, the inside of the tube may be smooth and polished by the use of suitable lacquers, enamels, finishes, or surfacing material. The tube 11 need not be in a single length but may be made up, if desired, of several sections fitted or joined together by suitable unions, flanges, slidable members, collars, or other clamping means. The interior of such joints should be smooth and without burrs or projecting sharp portions. As will be gathered from the foregoing, the purpose of the tube 11 is to guide the film without danger of scratching or injuring the emulsion surface.

The recorder 12 is suspended from the suitably designed tripod by a plurality of springs 14 and 16 which attach to an intermediate mount 15. Mechanical damping of spring oscillation may be introduced, as desired, and two forms of damping means are illustrated in Figs. 2 and 3, that shown in Fig. 2 being of the dashpot variety and including an oil-filled cylinder 20 which is pivotally secured to the mounting plate 15 through a pivotal collection 21. A piston 22 having a small aperture 23 therein has a pivotal connection 24 to the tripod head 17 and operates within the cylinder 20. The bearing surface of the piston 22 within the containing cylinder 20 is sufficiently thick to keep the assembly lined up. The oil within the cylinder 20 is of suitable viscosity and flows with viscous friction through the fine aperture 23 whenever approaching or receding motions, respectively, of the tripod head 17 and the mounting plate 15, as indicated by the arrows A in Fig. 2, take place. By selecting an oil or other suitable fluid of appropriate viscosity, by controlling the size of the aperture 23 (either by initial selection of its size or by the provision of an adjustable needle valve coacting with the aperture 23), and by selection of the area of the piston 22, it is, of course, possible to adjust the viscous friction or damping effect to any desired extent.

In Fig. 3 a more simplified damping arrangement is shown. In this modification, which is less capable of exact adjustment and which, although less expensive, is not quite as reliable and uniform in operation as the previously described damping arrangement, the damping material consists of some relatively inelastic and fibrous substance 25, such as cotton waste, steel wool, or other similar felt-like irregularly fibrous and inelastic material placed within the springs 14 to back up the springs. Motion of the springs 14 resulting from relative movement of the tripod head 17 and the mounting plate 15, as shown by the arrows B in Fig. 3, compresses or expands this fibrous mass with resulting damping and internal friction.

It will be obvious that any alternative flexible suspension in place of the springs 14 may be used for the recorder 12, the idea being to have the flexible suspension with suitable damping to retain the recorder in approximately constant position. The tube or conduit 11 is preferably also flexible, or at least it should contain a light-tight sliding union or joint enabling any necessary amount of lengthening or shortening of the tube 11 as the recorder 12 is raised or lowered relative to the camera 10. Of course, it will be desirable to have a suitable free film loop in either of the camera 10 or the recorder 12, or both, so that any changes in the length of the film guide tube 11 may be taken up by the film loop in question.

The negative obtained by the apparatus heretofore described is developed in a single developer, washed, fixed, again washed, dried, and otherwise processed in the usual way. It will be noted that picture and sound have been recorded and developed on a single film which, if the length of the film guide tube 11 is kept within reasonable bounds, will not be substantially greater than the length of the film required for the picture alone.

In the illustrated embodiment of my invention, the feed magazine is directly attached to the camera and the take-up magazine directly to the recorder. However, the magazines may be separated from the corresponding pieces of equipment and connected thereto by lengths of rigid or flexible tubing. This might enable placing both magazines close to the recorder and accordingly using thousand-foot or even larger magazines conveniently while retaining mobility and moderate camera dimensions.

The fact that each camera in each form of the above system has an associated and nearby recorder might be objected to. From the viewpoint of natural recording and reproduction, such an arrangement is, however, frequently desirable. If used in connection with properly placed directional microphones for recording, each picture that appears on the threatre screen will have associated sound which has the correct auditory perspective for a listener placed at approximately the location of the corresponding camera. Alternatively, a single directional pick-up can be used and the amplifier output supplied to each of the recorders, thus avoiding a multiplicity of pick-up microphones. The choice of methods will depend upon local studio conditions and the desired effect in each case.

In an article in the August 1934 issue of the "Journal of the Society of Motion Picture Engineers," Dr. Olson and Mr. Massa of the RCA Victor Company stress the importance of using directional sound pick-ups at the correct location. Speaking of one satisfactory arrangement of this sort, they say, "This example illustrates how a 'center of gravity' of the recorded sound can be established comparable with the 'center of gravity' of the action."

They further state, as the advantage of such a system, that it gives "an illusion of depth or perspective" and they add that "a new and powerful means of controlling sound reproduction becomes available for enhancing the illusion of reality and heightening the acoustical character of the performance."

It is desired particularly to emphasize the ready applicability of the system proposed by Dr. Olson and Mr. Massa to the sound motion picture system herein disclosed. In fact, the association of individual recorders with each camera and the use of directional pick-up equipment properly placed in each instance may well constitute, as previously stated, a major forward step in recording and reproducing technique.

Attention is again directed to the fact that the system herein disclosed is more economical of film than existing systems. It does not use any special positive film for sound recording, and uses no more film for the various angle cameras than at present. The sound track, in each case, is merely added to and recorded upon the picture film. By providing simplified recorders for use in those cases where they may be satisfactory, the total recorder cost, even when several angle cameras are used, can be kept at a low figure, especially if it is decided to feed all these recorders from a single microphone pick-up and amplifier.

I claim as my invention:

The combination of a motion picture camera, a support therefor, a sound recorder, flexible means subject to oscillation supporting said recorder from said support, means associated with said last named means for damping oscillations thereof, and a flexible opaque film guiding conduit extending between said camera and said recorder.

ALFRED N. GOLDSMITH.